US009658122B2

United States Patent
Saari et al.

(10) Patent No.: US 9,658,122 B2
(45) Date of Patent: May 23, 2017

(54) TRANSDUCER ACCELERATION COMPENSATION USING A DELAY TO MATCH PHASE CHARACTERISTICS

(71) Applicant: MTS Systems Corporation, Eden Prairie, MN (US)

(72) Inventors: Byron Saari, Minneapolis, MN (US); Mark Schletty, Richfield, MN (US)

(73) Assignee: MTS SYSTEMS CORPORATION, Eden Prairie, MN (US)

( * ) Notice: Subject to any disclaimer, the term of this patent is extended or adjusted under 35 U.S.C. 154(b) by 677 days.

(21) Appl. No.: 13/803,773

(22) Filed: Mar. 14, 2013

(65) Prior Publication Data

US 2013/0305840 A1 Nov. 21, 2013

Related U.S. Application Data

(60) Provisional application No. 61/648,854, filed on May 18, 2012.

(51) Int. Cl.
*G01L 1/26* (2006.01)
*G01L 19/02* (2006.01)

(52) U.S. Cl.
CPC ............... *G01L 1/26* (2013.01); *G01L 19/02* (2013.01)

(58) Field of Classification Search
CPC .................................. G01L 1/26; G01L 19/02
See application file for complete search history.

(56) References Cited

U.S. PATENT DOCUMENTS

| 5,856,620 | A | 1/1999 | Okada |
| 6,209,382 | B1 | 4/2001 | Komata |
| 7,331,209 | B2 | 2/2008 | Saari |
| 2006/0056823 | A1* | 3/2006 | Wu ......................... H02P 6/142 388/831 |
| 2006/0070424 | A1 | 4/2006 | Saari |
| 2010/0066423 | A1* | 3/2010 | Inukai .................... G01P 15/125 327/163 |

FOREIGN PATENT DOCUMENTS

| CN | 2090527 | 12/1991 |
| CN | 101868260 | 10/2010 |
| JP | 55918429 | 1/1984 |
| JP | 2008-164495 A | 7/2008 |
| JP | 09-258900 A | 11/2009 |
| JP | 09-280974 A | 12/2009 |
| WO | 2009101566 | 8/2009 |

OTHER PUBLICATIONS

International Search Report and Written Opinion for corresponding foreign application PCT/US2013/041367 filed May 16, 2013.

(Continued)

*Primary Examiner* — Paul West
(74) *Attorney, Agent, or Firm* — Steven M. Koehler; Westman, Champlin & Koehler, P.A.

(57) ABSTRACT

A method and system for correcting for the inertial error of a transducer as a function of frequency by applying a delay to a leading signal of the transducer to provide phase compensation.

23 Claims, 5 Drawing Sheets

(56) References Cited

OTHER PUBLICATIONS

First Office Action from the State Intellectual Property Office at People's Republic of China, issued Sep. 6, 2015 for corresponding foreign Chinese Application No. 201380032185.8, filed May 16, 2013.
Chinese Office Action for Chinese patent applicaiton No. 201380032185.8, dated Jun. 27, 2016.
Notice of Reasons for Rejection for Japanese patent application No. JP2015-51284, dated Dec. 20, 2016.
Communication from the European Patent Office for European patent application No. 13725867.9, dated Jan. 2, 2017.
Third Office Action from the People's Republic of China for Chinese patent application No. 201380032185.8, dated Feb. 16, 2017.

* cited by examiner

TRANSDUCER ACCELERATION COMPENSATION USING A DELAY TO MATCH PHASE CHARACTERISTICS

CROSS-REFERENCE TO RELATED APPLICATION

The present application is based on and claims the benefit of U.S. provisional patent application Ser. No. 61,648,854, filed May 18, 2012, the content of which is hereby incorporated by reference in its entirety.

BACKGROUND OF THE INVENTION

The discussion below is merely provided for general background information and is not intended to be used as an aid in determining the scope of the claimed subject matter.

The present invention relates generally to transducers such as force or pressure transducers. More particularly, the present invention relates to improved acceleration compensation for transducers.

Acceleration compensation is a technique that is often used in transducers such as force or pressure transducers. When such transducers are accelerated, this motion can cause error (inertial error) in the measurement. The transducer is comprised of a sensing element and additional mass attached to the sensing element. This additional mass can be fixturing mass or mass due to the structure of the transducer. Additional mass (not part of the unit under test) which is attached to what is known as the active side of the transducer will induce force onto the sensing element when the mass is accelerated. However, this inertial force is considered erroneous, because the force is not as a result of the force applied to the transducer from the unit under test but is instead a result of the force required to accelerate the mass of the fixturing and/or parts of the transducer itself.

Traditionally, force or pressure dynamic measurements are corrected for inertially induced errors with an accelerometer coupled to or placed in close proximity to the transducer such that the accelerometer senses acceleration in the direction(s) of motion in which the transducer error exists. Since the force error is proportional to the acceleration, a scalar value multiplied by the measured acceleration produces a compensation signal for the inertial error. The scalar value represents the mass of the fixturing or parts of the transducer on the active side of the sensing element.

Although the above-described compensation technique provides a compensation signal that can significantly improve transducer accuracy, in some situations more accuracy is desired.

SUMMARY OF INVENTION

This Summary is provided to introduce some concepts in a simplified form that are further described below in the Detailed Description. This Summary is not intended to identify key features or essential features of the claimed subject matter, nor is it intended to be used as an aid in determining the scope of the claimed subject matter.

A method and system for correcting for the inertial error of a transducer as a function of frequency for effective mass coupling is provided. As one aspect of the invention, a system includes a transducer and a sensor operably coupled to the transducer, the sensor providing a signal that is directly or indirectly related to acceleration. A compensator is adapted to receive at least one signal based on the output signals from the transducer or the sensor. Here and for the duration of this description and figures, an accelerometer can mean an accelerometer in the purest sense or can be substituted with an alternative motion sensor (i.e. displacement transducer) from which acceleration is derived through computation and/or manipulation. The compensator compensates the signal providing phase compensation by application of a delay.

As another aspect of the invention, a method of generating compensation information includes applying excitation motion to a transducer and a sensor obtaining response signals therefrom. The sensor is operably coupled to the transducer so as to provide a signal that is directly or indirectly related to acceleration. and. Compensation information is generated based on the response signals. The compensation information is adapted to provide phase compensation using a delay module, the time period of which is based on phase versus frequency of motion of the transducer. In particular, a technique described herein is a method of phase correction between the force and acceleration signals in order to achieve effective compensation. Rather than attempting to match the phase characteristic across all frequencies, this method attempts to approximate the phase characteristic at frequencies below dynamics of the system, for example mechanical resonant modes or filter frequencies. These dynamics of the system shall be generically referred to as modal frequencies. In many instances, this is sufficient to achieve effective acceleration compensation for the purposes of closed loop control and data collection.

At frequencies below the first modal frequency, the phase characteristic between the force and acceleration is fairly linear when viewed on a linear phase versus linear frequency scale. It has been found a linear phase versus frequency difference between two signals can easily be eliminated by introducing a delay to the leading signal. A delay will not change the magnitude of a signal but will change the slope of phase versus frequency. By selecting the beginning and ending frequencies for measuring the slope of the phase characteristics of the uncompensated system, acceleration compensation can be optimized over a desired frequency range.

Even though the frequency modal frequencies seen in the transducer signals may be well above the frequency range of interest for data and control, these modes create minor phase differences between the force and acceleration signals well below the modal frequencies. Without phase correction, the minor phase differences limit the effectiveness of acceleration compensation even at the lower frequencies. An advantage of the compensation apparatus and method provided herein is that delay compensation is a simple technique to implement yet it greatly improves the effectiveness of acceleration compensation at the lower frequencies.

DETAILED DESCRIPTION OF THE ILLUSTRATIVE EMBODIMENTS

This description introduces a technique to correct for the inertial error of a transducer as a function of not only a scalar representation for mass (traditional acceleration compensation) but also as a function of frequency which is approximated by use of a delay. In particular, as one aspect of the present invention, a compensation signal generated from techniques of the present invention provides phase compensation as a function of frequency by application of a delay.

Figure 1:
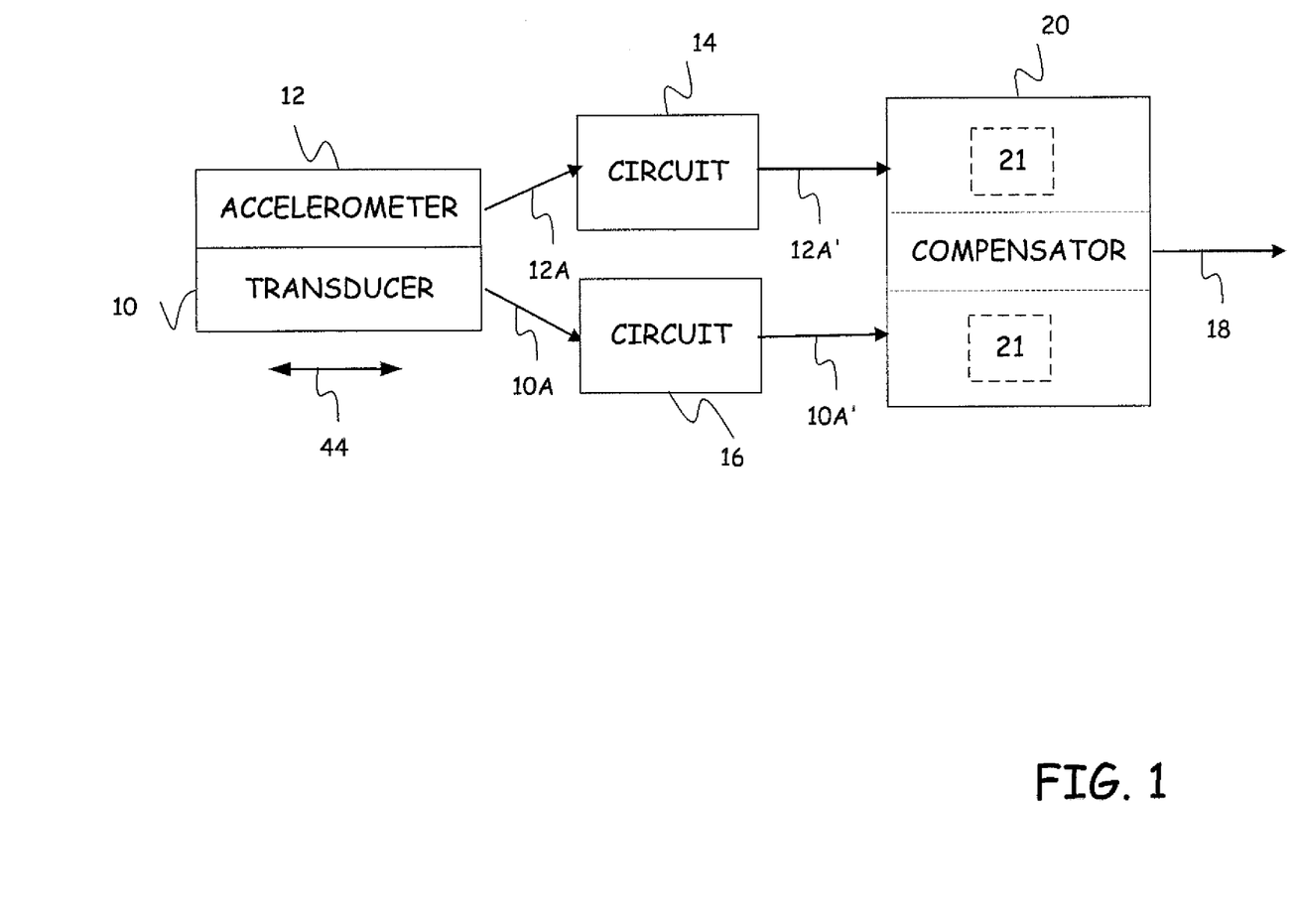
FIG. 1 is a schematic block diagram of a transducer system having a compensator to provide phase compensation by adding a delay.

As another aspect, this technique also differs from the known approaches because of this form of phase correction. FIG. 1 schematically illustrates a transducer 10 (e.g. force, torque or pressure), which provides an output signal 10A, and a sensor 12 capable of providing a signal 12A that can be used directly or indirectly to ascertain acceleration. In the embodiment illustrated, the sensor is an accelerometer that provides the acceleration signal directly; however, this is but one embodiment. If desired, the sensor 12 can be a sensor such as a displacement sensor that provides an output signal indicative of absolute or relative position, or otherwise distance traveled. Given also the time taken for the transducer 10 to change position from a timer not shown or otherwise part of the compensator 20 discussed below, the output signal from the displacement sensor can be processed to provide the signal indicative of acceleration, i.e in this situation, a derived acceleration.

It should be noted in the following description, the term "force" is to imply either "force," "torque" or "pressure".

A phase shift and/or a magnitude attenuation or amplification can exist between signals 10A and 12A as a function of frequency. In addition, a phase shift and/or a magnitude attenuation or amplification, or at least a part thereof, may also be due to processing circuits 14 and 16 receiving and processing the output signals 10A and 12A, respectively. For instance, some phase shift and/or a magnitude attenuation or amplification may occur due to different conditioners, filters, samplers, etc. that may introduce delays, or differing delays, which again may vary as a function of frequency.

An aspect of present invention described herein is a method of phase correction between the force and acceleration signals in order to achieve a form of compensation. Rather than attempting to match the phase characteristic across all frequencies, this method approximates the phase characteristic at selected frequencies such as a frequency range, for instance and in one advantageous embodiment, below the modal frequencies, preferably below a first modal frequency. In some applications, this is sufficient to achieve effective acceleration compensation for the purposes of closed loop control and data collection.

It has been found at frequencies below the first modal frequency, the phase characteristic between the force and acceleration is fairly linear when viewed on a linear phase versus linear frequency scale. In particular, it has been found that a linear phase versus frequency difference between two signals can easily be eliminated by introducing a delay to the leading signal. A delay will not change the magnitude of a signal but will change the slope of the phase versus frequency. By selecting the beginning and ending frequencies for measuring the slope of the phase characteristics of the uncompensated system, the acceleration compensation can be optimized over a desired frequency range.

Figure 2:
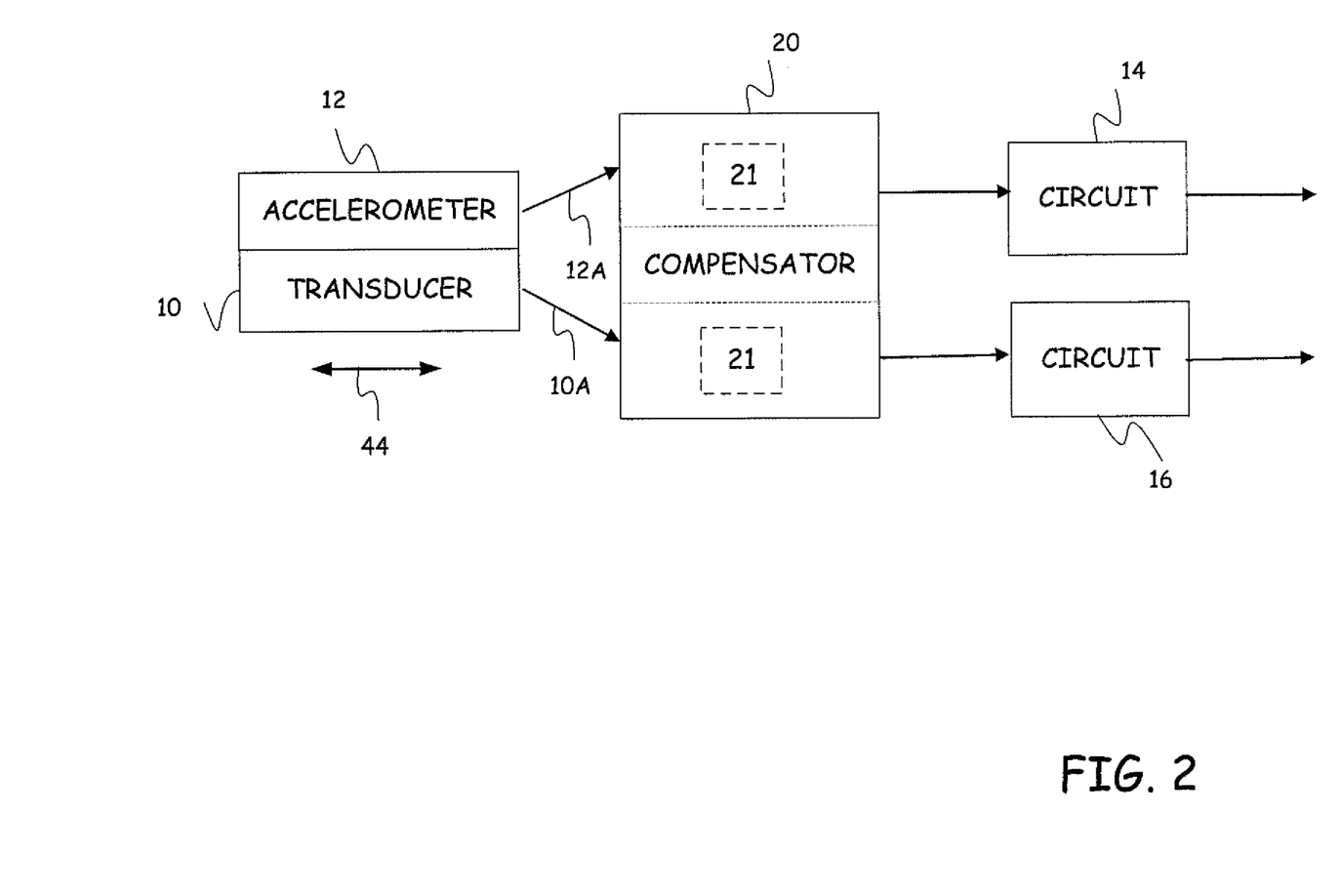
FIG. 2 is a schematic block diagram of a second transducer system having a compensator to provide phase compensation by adding a delay.

In one aspect of the present invention, a compensator device 20 (for example a digital delay) is adapted to receive one or both (herein exemplified as receiving both) of the output signals 10A, 12A (or a function thereof 10A', 12A' if processed earlier by circuits 14, 16, as illustrated in FIG. 2) and provide phase compensation as a function of frequency to one of the output signals 10A, 12A by application of or introducing a delay period, herein illustrated schematically as delay module 21 in order to provide a final compensated output signal 18. In FIG. 1, delay module 21 is illustrated with dashed lines to indicate that it would be applied to one of signals 12A' or 10A'.

As appreciated by those skilled in the art, compensator device 20 could receive the output signals 10A and/or 12A prior to circuits 14 and/or 16 as illustrated in FIG. 2. Typically if compensator device 20 receives both output signals 10A, 12A prior to circuits 14, 16, then compensator device 20 would provide two output signals. In such a case, typically each of circuits 14, 16 would not by themselves contribute appreciable phase difference between signals 10A' and 12A'. In other words, location of compensator device 20 provides the necessary phase compensation to one of the signals 10A or 12A, while each of circuits 14, 16 contribute negligible phase errors.

Compensator device 20 with delay module 21 may be embodied in hardware (analog and/or digital circuitry) and/or in software operable on a suitable computing device, such a digital signal processor, which also is circuitry. The circuitry can further include without limitation logic arrays and a system on a chip implementation that integrates some if not all circuitry and components of a computer or other electronic system that processes digital signals, analog signals, and/or mixed digital and analog signals on a single chip substrate. The output signals 10A, 12A may result from a testing environment, where the signals are compensated with compensating device 20 offline during analysis, and/or may operate in a control loop in real-time where the output signal 18 (FIG. 1), may be used to control a device.

Figure 3:
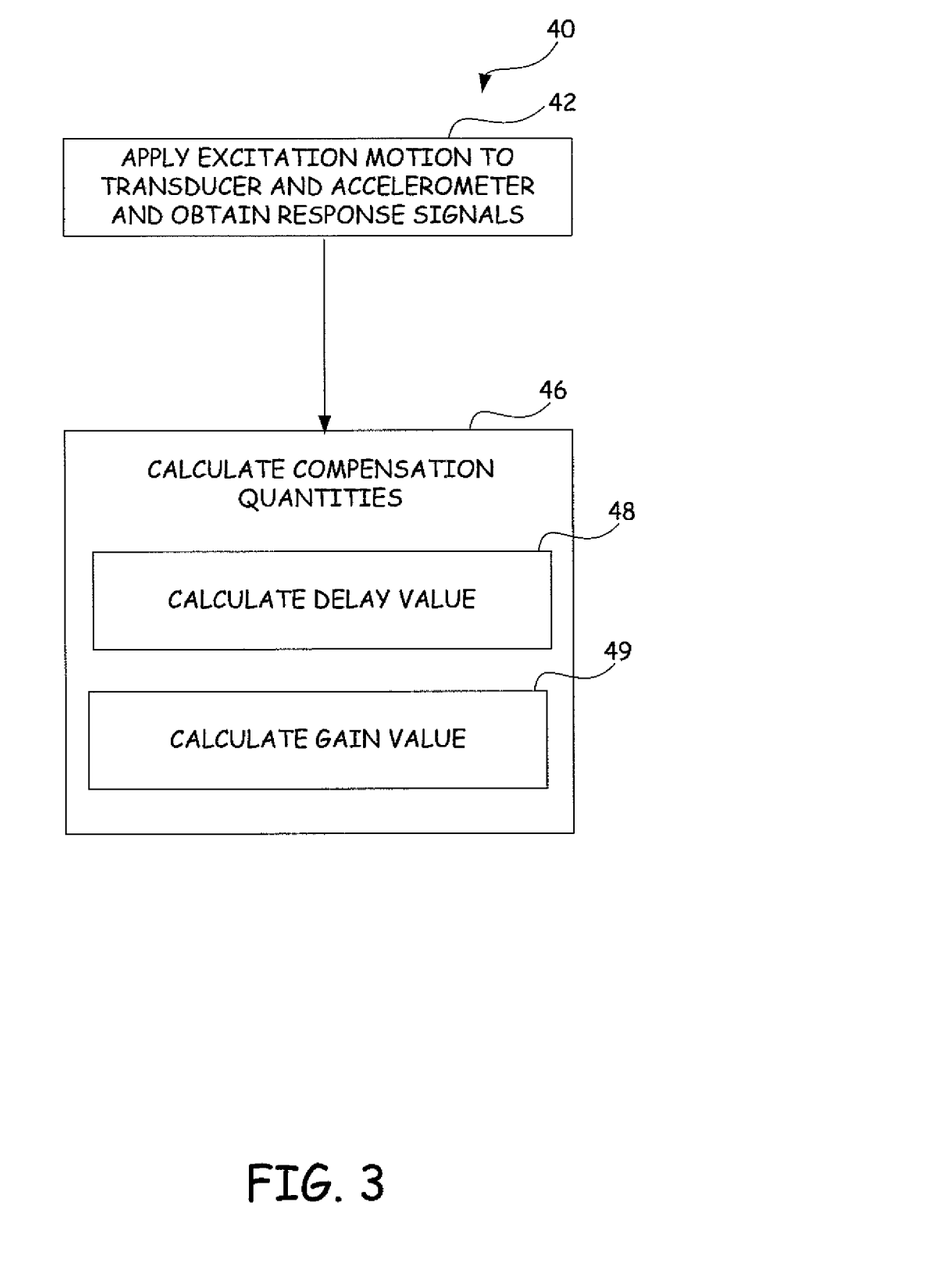
FIG. 3 is a flow chart of a method to ascertain compensation quantities.

FIG. 3 illustrates a method 40 for achieving effective acceleration compensation using phase compensation by application of a delay to the leading signal calculated via selected frequencies. At step 42, both the transducer and accelerometer are shaken or accelerated for instance by a shaker table, schematically indicated in FIG. 1 by double arrow 44. The characteristic of the dynamic displacement/motion 44 is that it is at or across a plurality of frequencies either changed continuously or discretely and in direction(s) that generate the inertial error. For instance, the characteristic of motion 44 can be, but not limited to, white noise, pink noise, impulse, step, or sine sweep. During application of the motion excitation 44, the output signals 10A, 12A before and/or after processing by circuits 14, 16 is obtained.

It should be noted that step 42 is typically performed with or at a known, external calibration load. For instance, if transducer 10 is a force transducer, step 42 can be performed with an external calibration load of zero, i.e. no force applied. Likewise, the known, external calibration load can be at some positive or negative load, or as discussed below, step 42 can be performed at a plurality of known, external calibration loads.

Figure 4:
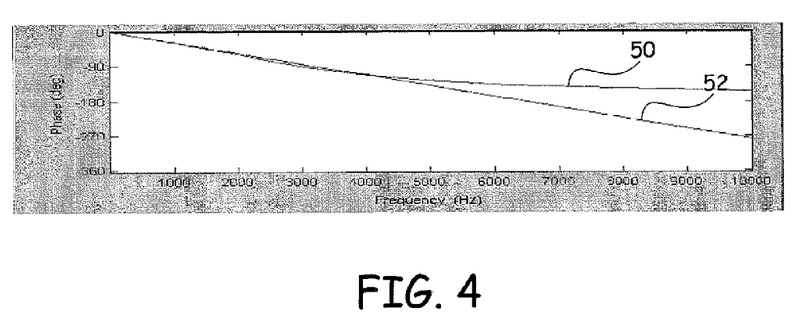
FIG. 4 is a plot of phase versus frequency for the system and an approximation.
Figure 5:
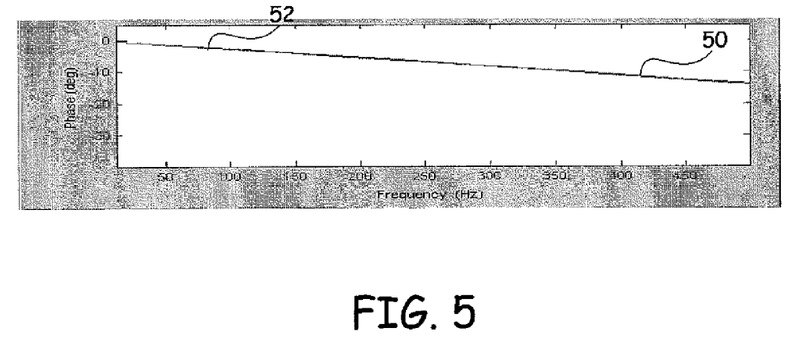
FIG. 5 is a plot of phase versus frequency for the system and an approximation of FIG. 4 over a narrower frequency range.

At step 46, compensation quantities are calculated or otherwise generated in manner suitable for use by compensation device 20. For instance, the frequency response function of the transducer output signal 10A with respect to the accelerometer output signal 12A is obtained. FIG. 4 illustrates phase verses frequency data of the transducer and accelerometer in the form of an exemplary plot at 50, while a proposed compensation quantity is indicated at 52. FIG. 5 illustrates the same plot as FIG. 4 over a narrower frequency range where lines 50 and 52 are effectively the same indicating that the proposed compensation quantity 52 is a good fit. Referring back to FIG. 3, generally, a frequency range over which to optimize the acceleration compensation is chosen. The frequency range should be typically below the lowest modal frequency of the system.

The delay value is calculated at 48. The acceleration compensation delay can be calculated from the slope of the phase over the selected frequency range. For instance, if frequency is in hertz (Hz) and the phase is in units of degrees, then the value for the compensation relative delay (in seconds) is slope/360. Data of the chosen frequency range shown as plots in FIGS. 4 and 5 is used to ascertain the value of the delay. The leading signal (force or acceleration) is then delayed using delay module 21 by the absolute value of the relative delay.

In addition, a gain correction would also commonly be calculated at 49. For instance, the gain correction can be the DC value of the transfer function, or the average value over the frequency range. It should be noted that the gain correction can be dependent on frequency, if desired.

Figure 6:
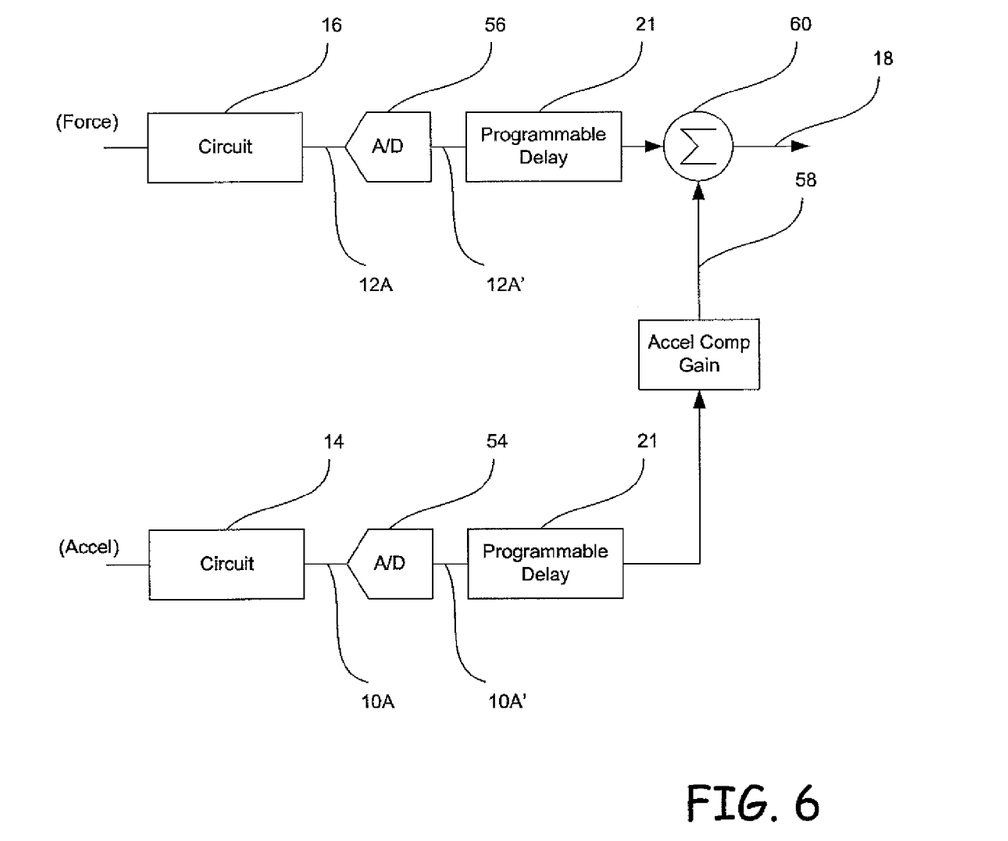
FIG. 6 is a block diagram of signal processing.

FIG. 6 illustrates as a block diagram application of the compensation quantities as applied to a digital signal processor, where signals 10A and 12A originate from analog to digital converters 54 and 56. The compensation signal 58 is calculated by multiplying the acceleration signal (or delayed acceleration signal as determined in step 48) by the calculated gain correction at step 49. The compensated force signal is obtained by adding (summer 60) the compensation signal 58 to the force signal (or delayed force signal as determined in step 48).

Generally, phase correction can be applied to the measured force output during normal operation. This correction can be applied to the acceleration signal then scaled and then be added to non-compensated force signal, or alternatively the correction can be applied to force signal then added to the scaled acceleration signal, or a combination of both. The variation from the first proposed method may be desirable if the phase lag of the force signal lagged behind that of the acceleration signal in the frequency range of interest.

In yet a further embodiment as mentioned above, step 42 can be performed at a plurality of known, external calibration loads. Accordingly, compensation quantities can be calculated or generated so as to be also based on an applied external load to transducer 12 besides being based on a function of frequency. In this manner, compensation quantities can be multi-dimensional, where compensation of transducer output signal 10A and/or accelerometer output signal 12A can be based on one or more frequency ranges and one or more other factors such as external applied load, displacement of the transducer or device connected thereto, environmental factors such as temperature, etc.

In yet another embodiment, the known, external calibration load(s) can have some frequency content, and where the load(s) may be measured by a trusted (i.e., accurate) transducer, the output of which is further used to generate or fine tune the compensation quantities.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. A system comprising:
   a transducer providing a transducer output signal;
   a sensor operably coupled to the transducer, the sensor providing a sensor output signal that is directly or indirectly related to acceleration; and
   a compensator connected to receive a leading signal of at least one of the transducer output signal or the sensor output signal,
   the compensator configured to calculate a delay value based on a slope of a phase of the leading signal over a selected frequency range of the leading signal, and
   including a delay module configured to delay the leading signal according to the delay value in order to minimize phase difference between the transducer output signal and the sensor output signal.

2. The system of claim 1 wherein the transducer comprises a force transducer.

3. The system of claim 2 wherein the compensator provides phase compensation based on another factor in addition to frequency.

4. The system of claim 3 wherein the other factor is applied external load.

5. The system of claim 1 wherein the transducer comprises a pressure transducer.

6. The system of claim 5 wherein the compensator provides phase compensation based on another factor in addition to frequency.

7. The system of claim 6 wherein the other factor is applied external load.

8. The system of claim 1 wherein the transducer comprises a torque transducer.

9. The system of claim 1 wherein the compensator provides gain compensation, and the compensator is configured to provide the gain compensation by using a DC value of a transfer function of the leading signal or an average value over the selected frequency range.

10. The system of claim 1 wherein the compensator provides phase compensation based on another factor in addition to frequency.

11. The system of claim 10 wherein the other factor is applied external load.

12. The system of claim 1 wherein the selected frequency range includes frequencies less than a first modal frequency.

13. The system of claim 1 wherein the sensor comprises an accelerometer.

14. The system of claim 1 wherein the sensor comprises a displacement sensor.

15. A method of providing acceleration compensation to a transducer comprising:
   applying excitation motion to a transducer and a sensor in a system and obtaining a transducer output signal and a sensor output signal, wherein the sensor is operably coupled to the transducer, and wherein the sensor output signal is directly or indirectly related to acceleration;
   receiving a leading signal of at least one of the transducer output signal or the sensor output signal;
   using circuitry to calculate a delay value based on a slope of a phase of the leading signal over a selected frequency range of the leading signal; and
   using circuitry to delay the leading signal according to the delay value, in order to minimize phase difference between the transducer output signal and the sensor output signal.

16. The method of claim 15 and further comprising applying an external calibration load to the transducer.

17. The method of claim 15 wherein applying excitation motion to the transducer and the sensor and obtaining the transducer and sensor output signals therefrom includes applying no external calibration load to the transducer.

18. The method of claim 17 wherein applying excitation motion to the transducer and the sensor and obtaining the transducer and sensor output signals therefrom includes applying a plurality of external calibration loads to the transducer.

19. The method of claim 15 wherein applying excitation motion to a transducer and the sensor and obtaining the transducer and sensor output signals therefrom includes applying a plurality of external calibration loads to the transducer.

20. The method of claim 15 wherein applying excitation motion comprises applying excitation motion with one or more frequencies less than a first modal frequency.

21. The method of claim 15 wherein the sensor comprises an accelerometer.

22. The method of claim 15 wherein the sensor does not comprise an accelerometer and delaying of the leading signal comprises processing the sensor output signal to obtain a derived acceleration signal.

23. The method of claim 15 and further comprising using circuitry to provide gain compensation by using a DC value of a transfer function of the leading signal or an average value over the selected frequency range.

* * * * *